United States Patent
Krill

(10) Patent No.: US 7,075,213 B2
(45) Date of Patent: Jul. 11, 2006

(54) VARIABLE RATIO TRANSMISSION ELEMENTS FOR MOTOR DRIVE SHAFTS

(75) Inventor: Jerry A. Krill, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 166 days.

(21) Appl. No.: 10/892,908

(22) Filed: Jul. 16, 2004

(65) Prior Publication Data

US 2005/0162049 A1    Jul. 28, 2005

Related U.S. Application Data

(60) Provisional application No. 60/539,680, filed on Jan. 28, 2004.

(51) Int. Cl.
*H01L 41/08* (2006.01)

(52) U.S. Cl. .................. 310/328; 310/331; 310/800

(58) Field of Classification Search .............. 310/228, 310/330–332, 800
See application file for complete search history.

(56) References Cited

U.S. PATENT DOCUMENTS

| | | | |
|---|---|---|---|
| 6,069,420 A | 5/2000 | Mizzi et al. | |
| 6,084,321 A | 7/2000 | Hunter et al. | |
| 6,664,718 B1 | 12/2003 | Pelrine et al. | |
| 6,806,621 B1 * | 10/2004 | Heim et al. | 310/328 |
| 6,809,462 B1 * | 10/2004 | Pelrine et al. | 310/319 |
| 6,891,317 B1 * | 5/2005 | Pei et al. | 310/328 |
| 6,902,048 B1 * | 6/2005 | Chung | 192/48.2 |
| 6,911,764 B1 * | 6/2005 | Pelrine et al. | 310/328 |
| 6,940,211 B1 * | 9/2005 | Pelrine et al. | 310/330 |
| 2001/0026165 A1 | 10/2001 | Pelrine et al. | |
| 2002/0008445 A1 | 1/2002 | Pelrine et al. | |
| 2002/0054060 A1 | 5/2002 | Schena | |
| 2002/0175598 A1 | 11/2002 | Heim et al. | |
| 2002/0185937 A1 | 12/2002 | Heim et al. | |
| 2003/0006669 A1 | 1/2003 | Pei et al. | |
| 2004/0008853 A1 | 1/2004 | Pelrine et al. | |

OTHER PUBLICATIONS

Penn State College of Engineering News & Media, Office of Engineering College Relations, "New flat motor can drive shape shifters, movers, and shakers," Jan. 28, 2003 article from internet www.engr.psu.edu/News/News/2003_Press_Releases/01_2003/flat_motor.htm printed Feb. 6, 2004.

Steven Ashley, "Artificial Muscles," Scientific American Oct. 2003, pp. 52-59.

(Continued)

*Primary Examiner*—Mark Budd
(74) *Attorney, Agent, or Firm*—Albert J. Fasulo, II

(57) ABSTRACT

A motor transmission element includes an axle, an expandable circumferential component and multiple rolled electroactive polymer (EAP) devices. The circumferential component is located at a contact radius from the axle for connection to a different rotating body and is mechanically connected to the axle. The rolled EAP devices are mechanically connected to the circumferential component and the axle. Each rolled EAP device has a pair of input electrodes and is configured to deform substantively parallel to a roll longitudinal axis upon application of a voltage difference. Deformation of a rolled EAP device causes a change in the contact radius. A voltage difference that expands the rolled EAP device increases the contact radius, and thereby the circumference of the transmission element. By varying the voltage, a continuously variable ratio can be achieved between a rate of rotation of the transmission element and a rate of rotation of the second body.

21 Claims, 9 Drawing Sheets

OTHER PUBLICATIONS

"WorldWide ElectroActive Polmers, WW-EAP (Artificial Muscles) Newsletter," Pasadena, CA Yoseph Bar-Cohen, Editor, Jun. 2003, vol. 5, No. 1, pp. 1-15 (entire newsletter).

J. Jang and Eric M. Mockensturm, "A Novel Motion Amplifier Using Axially Driver Buckling Beam," Proceedings of 2003 ASME International Mechanical Engineering Congress, Washington, DC, Nov. 15-21, 2003.

"Artificial Muscle Transducers," SRI International, Menlo Park, CA from "Areas of Expertise" article from internet http://www.artificialmuscle.com printed Feb. 6, 2004.

* cited by examiner

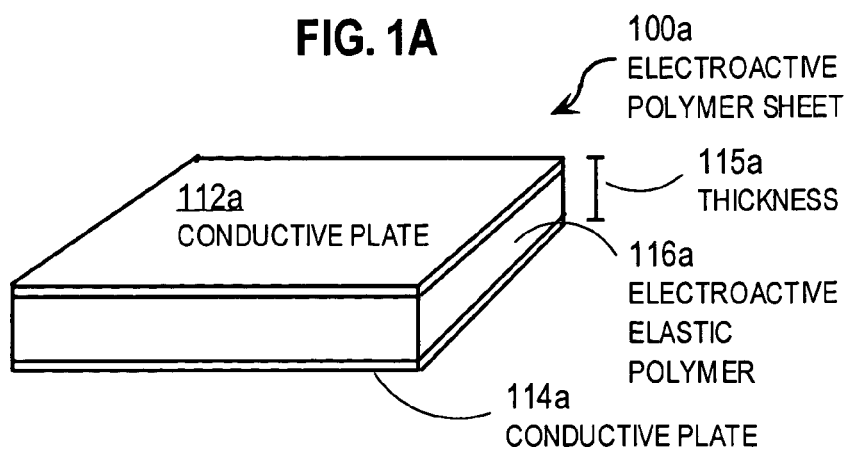
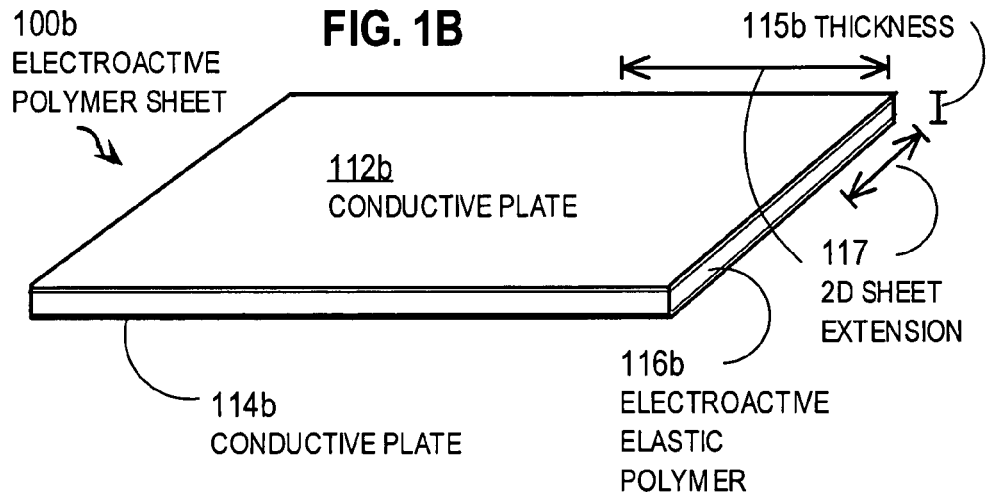
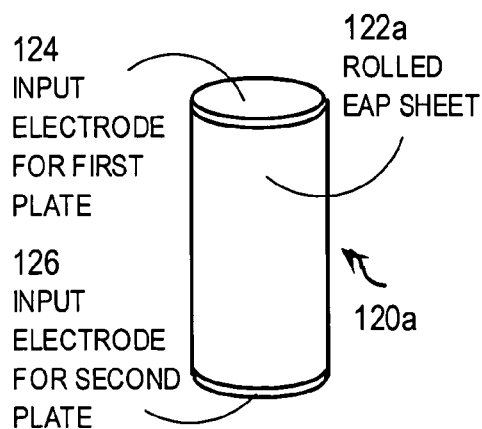 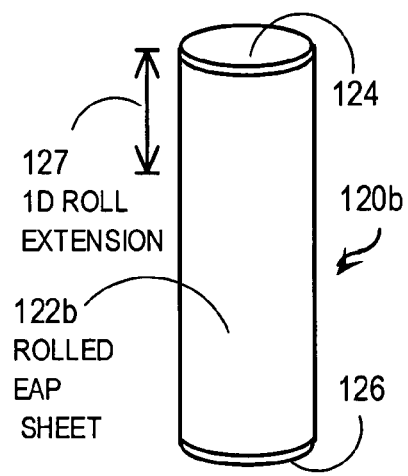

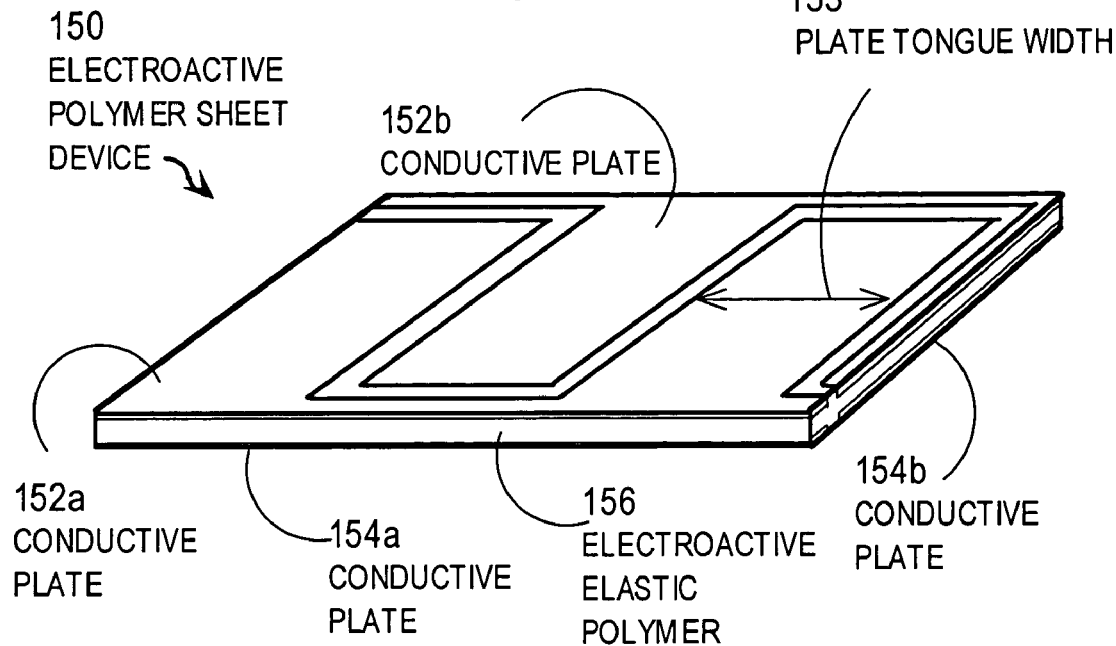
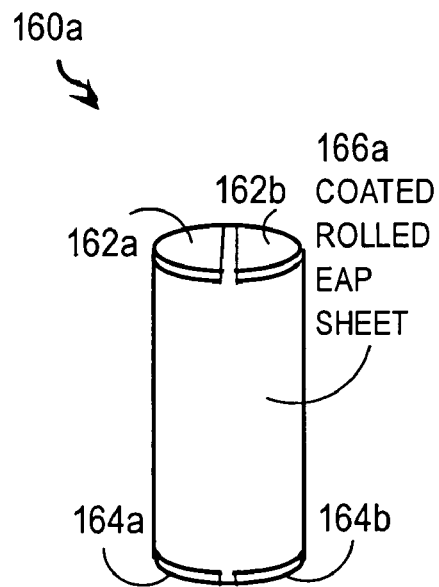
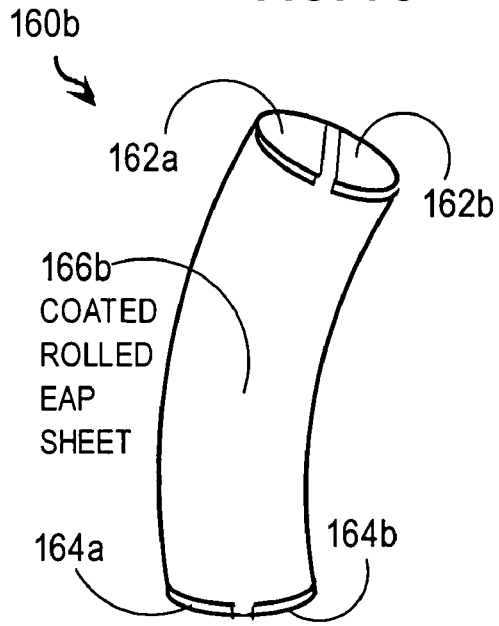

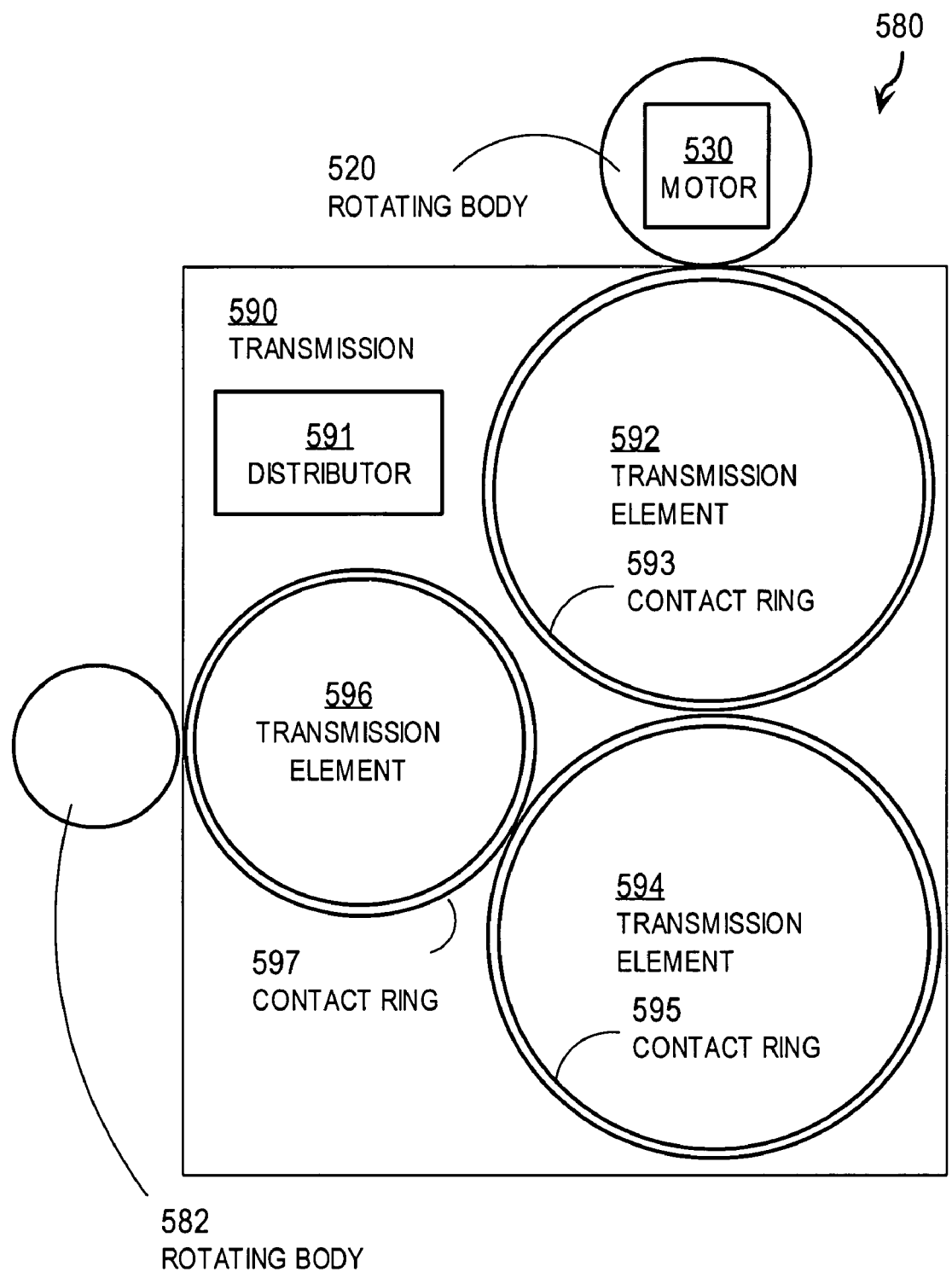

VARIABLE RATIO TRANSMISSION ELEMENTS FOR MOTOR DRIVE SHAFTS

CROSS-REFERENCE TO RELATED APPLICATIONS

This application claims benefit of U.S. Provisional Application 60/539,680, filed Jan. 28, 2004, the entire contents of which are hereby incorporated by reference as if fully set forth herein, under 35 U.S.C. §119(e).

This application is related to U.S. non-provisional patent application Ser. No. 10/892,910 filed on even date herewith by inventor Jerry A. Krill, entitled "Dielectric Motors with Electrically Conducting Rotating Drive Shafts and Vehicles Using Same" (referenced hereinafter as Krill), which is incorporated herein by reference in its entirety.

BACKGROUND OF THE INVENTION

1. Field of the Invention

The present invention relates to transmissions for motor drive shafts; and in particular to variable ratio transmission elements for rotating drive shafts, including transmission elements that use electroactive polymer devices.

2. Description of the Related Art

Conventional transmissions for electric motors and combustion engines are widely used in commerce but are not appropriate for all applications. For example, there is use for a class of balloon vehicles that supports a payload at high altitude at a relatively fixed geographic location for extended periods of time. The high altitudes may include the stratosphere layer of the atmosphere or the atmosphere of a different planet, such as Mars. Such a vehicle can support a communication terminal or surveillance system that covers a much wider area than can be served by a tower and gives more temporal coverage and detail than can be achieved from a winged aircraft or an orbiting satellite. To maintain geographic position in the presence of high altitude winds, where the air has low density, a motor and transmission are useful that can turn a station-keeping propeller that is both large and slowly rotating. Another class of vehicles includes spacecraft and satellites, which need light, efficient technology, for example to extend arms and panels or open or close compartments. Rovers delivered by these vehicles—like the Mars rovers—also could use lightweight and efficient motors and transmission elements.

A desirable motor and transmission would be capable of providing one to several horsepower. For extended duration, the motor and transmission should be highly efficient, turning most of the energy available on board into mechanical rotation and dissipating very little as heat. To leave capacity for payload, the motor and transmission should be light, e.g., on the order of fifty pounds or less. In applications that benefit from security against attack from hostile entities, the whole platform, including the motor and transmission, should have small radar reflectivity, e.g., be as transparent to radar as plastic materials.

Transmissions for conventional engines include gear boxes and metal gears that are both heavy and highly reflective to radar signals. In some vehicles, a small electric or compressed gas or EAP motor may be used with a mechanical transmission system to covert high rpm, low torque motors to low rpm, high torque power sources. However, a metallic gearbox mechanical transmission system suffers from the same deficiencies of heavy weight and large radar reflectivity that a larger motor would.

A new class of devices uses electroactive polymers (EAPs) to convert from electrical to mechanical energy. When a voltage is applied to electrodes in contact with an EAP, the EAP deforms. An EAP sandwiched between stretchable electrodes deforms in two dimensions as described in U.S. Pat. No. 6,664,718 by Pelrine et al., entitled "Monolithic Electroactive Polymers" (hereinafter, Pelrine). Metallic content can be reduced substantially in such devices. The electrodes can be thin or formed with non-metallic conductors, such a carbon nanotubes. The transfer from electrical energy to mechanical energy is quite efficient.

Many prior art transmissions require multiple wheels to provide multiple rotation rate ratios. The multiplicity of wheels in a gearbox leads to larger size, greater weight, more complexity, and less reliability, than a transmission that can achieve variable rotation rate ratios using a single axle.

Based on the foregoing there is a clear need for a mechanical transmission system that does not suffer the disadvantages of prior art mechanical transmission systems. In particular, there is a need for a lightweight, low-metallic mechanical transmission system with variable rotation rate ratios using a single axle.

The approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

SUMMARY OF THE INVENTION

A transmission is provided that can avoid the limitations of the prior art. For example, transmissions can be built to obtain several different rotation rate ratios from the same transmission element just by expanding the circumference of the transmission element. In some embodiments, the circumference is expanded by extending rolled electroactive polymer (EAP) devices to different lengths. Such a transmission element can be constructed of lightweight materials with low radar reflectivity. In some heavier embodiments, exposed metal parts are coated with radar absorbing material (RAM).

According to one set of embodiments, a motor transmission element includes an axle, an expandable circumferential component and multiple rolled electroactive polymer (EAP) devices. The circumferential component is located at a contact radius from the axle for connection to a different rotating body and is mechanically connected to the axle. The rolled EAP devices are mechanically connected to the circumferential component and the axle. Each rolled EAP device has a pair of input electrodes and is configured to deform substantively parallel to a roll longitudinal axis upon application of a voltage difference. Deformation of a rolled EAP device causes a change in the contact radius. A voltage difference that expands the rolled EAP device increases the contact radius, and thereby the circumference of the transmission element. By varying the voltage, a continuously variable ratio can be achieved between a rate of rotation of the transmission element and a rate of rotation of the second body.

According to another set of embodiments, a transmission element includes an axle, multiple spokes connected to the axle, and multiple rolled electroactive polymer (EAP) devices. Each rolled EAP device has at least a first pair of input electrodes. The EAP devices are arranged azimuthally around the axle at a particular radius and are mechanically connected to the spokes. Deformation of the rolled EAP device causes a change in the particular radius. For example, a voltage difference that expands the rolled EAP device increases the radius from the axle to the EAP device, and thereby increases the circumference of the transmission element, changing the rate of rotation of a second body contacting the circumference of the transmission element.

In some of these embodiments, the transmission also includes an expandable circumferential component at a contact radius. The circumferential component is for connecting to a different rotating body. Deformation of the rolled EAP device causes a change in the contact radius. The change is based on the change in the particular radius.

In some embodiments the circumferential component is a rough surface on the rolled EAP devices. In some embodiments, the circumferential component is a separate ring with a rough surface. The separate ring is attached to a spoke or a rolled EAP device, or both.

In some embodiments, the circumferential component includes rows of gear teeth that slide independently of each other when the circumference of the expandable circumferential component changes. Teeth in each row are aligned with gaps between teeth on the connection to the second rotating body at several different values for the radius.

In some embodiments, the transmission element includes an electrical distributor to supply a first voltage to the first pair of electrodes.

According to another set of embodiments, a transmission element includes an axle, an expandable circumferential component at an outer radius from the axle, and multiple rows of gear teeth along the circumferential component. Each row of gear teeth slides independently of other rows of gear teeth when the circumference of the circumferential component changes. Teeth in each row are aligned between teeth on a connection to a different rotating body at several different values for the outer radius and the corresponding circumference.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a block diagram that illustrates a electroactive polymer sheet device in a first state;

FIG. 1B is a block diagram that illustrates the electroactive polymer sheet device of FIG. 1A in a different, second state;

FIG. 1C is a block diagram that illustrates a rolled electroactive polymer device in a first state;

FIG. 1D is a block diagram that illustrates the rolled electroactive polymer device of FIG. 1C in a different, second state;

FIG. 1E is a block diagram that illustrates a different electroactive polymer sheet device;

FIG. 1F is a block diagram that illustrates a different rolled electroactive polymer device in a first state;

FIG. 1G is a block diagram that illustrates the different rolled electroactive polymer device of FIG. 1F in a different, second state;

FIG. 5C is a block diagram that illustrates use of a transmission element in a transmission, according to a third embodiment.

DETAILED DESCRIPTION

Figure 2A:
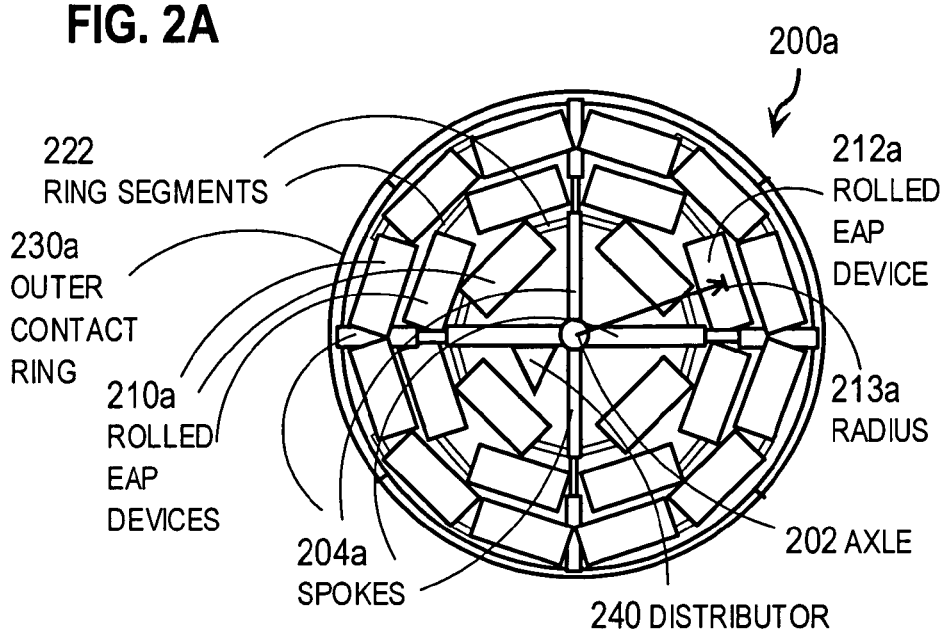
FIG. 2A is a block diagram that illustrates a transmission element in a first state, according to an embodiment.

Motor transmissions are described that change their circumferences, such as by using electroactive polymer (EAP) devices. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Many embodiments of the invention are described in the context of a transmission for a lightweight vehicle of low radar reflectivity, which is made possible using many of the described embodiments. For example, in some embodiments, the transmission element is used with a lightweight, low-metallic motor using rolled EAP devices with sufficient horsepower, as described in Krill. However, the invention is not limited to this context, and may be employed in heavier vehicles, with greater radar reflectivity, as well as in non-vehicular applications. Embodiments of the transmission element may be used with any rotary type motor, including combustion engines and electric motors. In some embodiments the transmission element is used with animal or human power, such as in bicycles.

As described in Pelrine and illustrated in FIG. 1A and FIG. 1B, an electroactive polymer (EAP) deforms under the influence of a strong electrical field. FIG. 1A is a block diagram that illustrates an EAP sheet device 100a in a first state. The device 100a includes electroactive elastic polymer 116a, sandwiched between conductive plates 112a, 114a. For purposes of illustration, it is assumed that the first state corresponds to applying no electrical potential (voltage) difference between the conductive plates 112a, 114a. The sheet device 100a has a thickness 115a that is on the order of tens of microns (1 micron=1 micrometer=$10^{-6}$ meters).

FIG. 1B is a block diagram that illustrates the EAP device 100b which is the same as device 100a of FIG. 1A but in a different, second state. The device 100b includes electroactive elastic polymer 116b, sandwiched between conductive plates 112b, 114b. For purposes of illustration, it is assumed that the second state corresponds to maintaining a large voltage difference (thousands of volts) between the conductive plates 112b, 114b. As shown in FIG. 1B, the electroactive elastic polymer 116b has thinned and stretched under the influence of the voltage difference. The conductive plates 112b, 114b have also thinned and stretched with the polymer, which is possible for some conductors made of certain materials, as described in Pelrine. The device 100b has thinned to a thickness 115b, less than thickness 115a of the device 100a in the first state. The device 100b has stretched in two dimensions as indicated by the sheet extension arrows 117. Because the polymer is a non-conducting dielectric, very little current flows while in each state.

The maximum extension and corresponding voltage difference depends on the material and construction of the EAP sheet device. For example, the EAP sheet device can be formed under tension so that the sheet expands further under the influence of the voltage difference. Alternatively, the EAP sheet device can be formed under tension so that it shrinks, rather than expands, under an applied voltage differences. Some known sheet devices have achieved strains (percentage change in linear dimension) of 10 to 15 percent. The sheets are thin and may be too fragile for many macroscopic applications.

A particular arrangement of electroactive polymer and electrodes is described in U.S. patent application US 2003/0006669 by Pei et al., entitled "Rolled Electroactive Polymers" (hereinafter, Pei), the entire contents of which are hereby incorporated by reference as if fully set forth herein. This arrangement of EAP and electrodes is called hereinafter a spring roll EAP. Spring roll EAPs are considered herein to be members of a more general class of rolled EAP devices. Other rolled EAP devices may include or omit springs or other pre-tensioning elements, and may have cross sections that are not circular. For example, triangular cross sections may be used in some rolled EAP devices.

FIG. 1C is a block diagram that illustrates a rolled EAP device 120a in a first state. The electroactive polymer sheet device 100a of FIG. 1A is rolled to form a rolled EAP sheet 122a. Conductive plate 112a of sheet device 100a is connected to one input electrode 124. Conductive plate 114a of sheet device 100a is connected to a second input electrode 126. The sheet 100a may be rolled on a pre-tensioned spring (not shown). The rolled sheet may be coated to reduce or prevent inadvertent charging or damage on the outermost conductive plate.

FIG. 1D is a block diagram that illustrates the rolled EAP device 120b, which is the same as the device 120a of FIG. 1C but in a different, second state. The device 120b includes electrodes 124, 126 and a rolled EAP sheet 122b in the second state. For purposes of illustration, it is assumed that the second state corresponds to maintaining a large voltage difference between the input electrodes 124, 126 and their corresponding plates. As shown in FIG. 1D, the cylinder has stretched under the influence of the voltage difference. The device 120b has stretched in one dimension as indicated by the roll extension arrow 127.

Known spring rolls are cylindrical in shape, with a diameter less than 2 centimeters (cm, 1 cm=$10^{-2}$ meters) and a length of about six cm. When a voltage is applied, the roll can extend 2 cm (about 30%) and produce 6.6 pounds of force. Extension-retraction cycles can be performed at rates up to 50 Hz. It is expected that advances in this field will yield more EAP materials and rolled EAP materials with greater strength or strain or cycle rates or some combination of improvements. For purposes of illustration, it is assumed that rolled EAP devices are utilized with the properties of currently known spring rolls. It is anticipated that more advanced rolled devices may be substituted into the following embodiments, with commensurate changes in the number and size of the illustrated elements.

Rolled EAP devices offer more power per unit volume than EAP sheet devices. The spring roll EAP devices are also expected to be less fragile than their sheet counterparts. The one dimensional stroke (range of motion during one extension-retraction cycle) is easier to tap and requires fewer constraining components. Such constraining components add to complexity and may increase unreliability in macroscopic devices based on the EAP sheet devices.

Spring rolls need not expand symmetrically, and can be built to extend more on one side than anther. FIG. 1E is a block diagram that illustrates a different electroactive polymer sheet device 150 for use in an asymmetric expanding spring roll. In device 150 the electroactive elastic polymer 156 is sandwiched between two pairs of plates. On the top, conductive plates 152a, 152b make up a pair of plates that can be charged separately. The plates include alternating tongues of conductive material. The width of one tongue is illustrated by arrow 153. On the bottom, conductive plates 154a, 154b make up a second pair of plates that can be charged separately. In the illustrated embodiment, lower plate 154a is matched in shape and position with upper plate 152a; lower plate 154b is matched in shape and position with upper plate 152b. In other embodiments, one pair of plates on the same side of the polymer 156 may be combined into a single plate; e.g., plates 154a and 154b can be combined into a single plate. With either arrangement, a different voltage difference can be applied to the polymer 156 beneath plate 152a than is applied to the polymer 156 beneath plate 152b. Therefore deformation is not homogeneous across the sheet device 150.

FIG. 1F is a block diagram that illustrates a different rolled electroactive polymer device 160a in a first state. This device 160a is made by rolling the sheet device 150 to produce the coated rolled sheet 166a. The sheet device 150 is rolled so that the width of the plate tongues 153 matches half a perimeter of the rolled sheet 166a. The coated rolled sheet 166a is coated to reduce or prevent exposing the pair of plates on the outside of the rolled sheet from being inadvertently charged or damaged. A pre-tensioned spring may be included in the rolled sheet in some embodiments. Four input electrodes 162a, 162b, 164a, 164b are included to provide separate electrical connections to the separate plates 152a, 152b, 154a, 154b. In some embodiments in which two plates are combined, one of the input electrodes can be omitted.

FIG. 1G is a block diagram that illustrates the different rolled electroactive polymer device 160b which is the same as the rolled electroactive device of FIG. 1F but in a different, second state. It is assumed for purposes of illustration that the spring roll 160a expands to a maximum deformation upon application of a voltage difference up to a maximum effective voltage. In other embodiments, the deformation is maximum in the absence of an applied voltage difference and shrinks upon application of a voltage difference. In the state depicted in FIG. 1G the spring roll 160b has had a greater voltage difference applied across one set of two plates (a matched plate from each pair) than across the other set of two plates. For purposes of illustration it is assumed that input electrodes 162a, 162b are connected to top plates 152a, 152b, respectively, and that input electrodes 164a, 164b are connected to bottom plates 154a, 154b, respectively. It is further assumed that matched plates 152*a*, 154*a* cause the left side of spring roll 160*b* to deform while matched plates 152*b*, 154*b* cause the right side of spring roll 160*b* to deform. Then the state of device 160*b* is achieved by applying a greater voltage difference across input electrodes 162*a*, 164*a* than is applied across input electrodes 162*b*, 164*b*. For example, both input electrodes 164*a*, 164*b* can be grounded and the maximum voltage can be applied to input electrode 162, while 80% of the maximum voltage is applied to input electrode 162*b*. The left side of device 160*b* is deformed more than the right side so that the device both extends and bends, forming a curved profile.

Transmission Element

According to embodiments of the invention, a transmission element for a transmission changes its circumference by multiple degrees from a minimum to a maximum circumference. Because the ratio of circumferences determines a ratio of rotation rates for two rotating bodies in circumferential connection, a variable circumference leads to a variable ratio transmission with a single transmission element.

According to one set of embodiments, a transmission element for a transmission uses multiple rolled EAP devices to change the circumference of the transmission element. The circumference can be changed relatively continuously from a minimum to a maximum circumference by varying a voltage difference supplied to the input electrodes of the EAP devices between a minimum effective voltage and a maximum effective voltage.

For purposes of illustration, a transmission element is described that has three rings of asymmetrically expanding rolled EAP devices and various other components. In the illustrated embodiment, the innermost ring has four asymmetric rolled EAP devices, the middle ring has eight asymmetric rolled EAP devices, and the outer ring has twelve asymmetric rolled EAP devices. In other embodiments more or fewer rings with more or fewer or different rolled EAP devices are used, and more or fewer or different other components may be used. For example, symmetric spring rolls may be used in some embodiments. In some embodiments, the rolled EAP devices are arranged in radial spokes instead of, or in addition to, one or more rings.

FIG. 2A is a block diagram that illustrates a transmission element 200*a* in a contracted state, according to an embodiment. Transmission element 200*a* includes an axle 202, extendable spokes 204*a*, rolled EAP devices 210*a*, ring segments 222, an outer contact ring 230*a* and distributor 240.

The axle 202 is a rotating support member that is rotatably connected to a support structure (not shown), either directly or through another rotating body such as a motor drive shaft, a wheel or propeller. In some embodiments, the axle 202 is made of lightweight materials, such as honeycombed plastic and composite materials, with little metal content and small radar reflectivity. In some embodiments, the axle 202 includes metal with a significant surface and is coated with a radar absorbing material (RAM).

The extendable spokes 204*a* are in a contracted state and are connected to the axle 202. In the illustrated embodiment, four extendable spokes 204*a* are attached to the axle 202. In other embodiments, more or fewer spokes may be used. In the illustrated embodiment, the spokes 204*a* are evenly angled around the axle 202; in other embodiments, the spokes may be distributed unevenly in angle around the axle 202, with commensurate adjustments in ring segment lengths and other components. In some embodiments, described in more detail below, one or more extendable spokes are connected to the axle indirectly through one or more ring segments. Several embodiments of the extendable spokes are described in more detail below. In some embodiments, the extendable spokes 204*a* are made of lightweight materials, such as honeycombed plastic and composite materials, with little metal content and small radar reflectivity. In some embodiments, the extendable spokes includes metal with a significant surface and are coated with a RAM.

The rolled EAP devices 210*a* are in a contracted state and are connected to the spokes 204*a*. The rolled EAP devices are arranged azimuthally around the axle in one or more rings. In the illustrated embodiment, 24 rolled EAP devices are arranged azimuthally in three rings, at three corresponding radii. For example, the middle ring has eight rolled EAP devices at a particular radius 213*a*. In the illustrated embodiment, some rolled EAP devices are attached to a spoke 204*a*, and some rolled EAP devices are connected indirectly to a spoke 204*a* through one or more ring segments 222 or other rolled EAP devices 210*a* or both. At least one insulated electrical connection is made with each rolled EAP device 210*a*.

In the illustrated embodiments, the insulated electrical connection is made through spokes 204*a* with or without connections through one or more ring segments 222. Each insulated electrical connection provides a time varying voltage different from the voltage of any electrically conducting portions of the structural elements of the transmission element 200*a*. In some embodiments, the spokes 204*a* and ring segments 222 are electrically conductive and maintained at the electrical potential of electrical ground (taken by convention to be zero voltage) and two electrodes 164*a*, 164*b* of each asymmetric rolled EAP device are electrically connected through a spoke or ring segment to electrical ground. In some of these embodiments, the insulated electrical connection is connected to the input electrode for the side of the rolled EAP device farther from the axle, e.g., electrode 162*a*. A voltage drop (e.g., a resistor) is connected in series between the insulated electrical connection and the input electrode for the side of the rolled EAP device closer to the axle, e.g. electrode 162*b*. In this embodiment, a single time varying voltage applied on the insulated connection can deform each rolled EAP device 210*a* to extend substantively along a roll axis of the rolled EAP device and bend into a curved profile, a shown in FIG. 1G. In the contracted state of transmission element 200*a*, zero voltage is supplied at the insulated connection. In other embodiments, two or more electrically insulated connections are passed to each rolled EAP device to independently drive input electrodes 162*a*, 162*b* or other electrodes.

In some embodiments, the rolled EAP devices and electrical connections are made of lightweight materials, such as honeycombed plastic, carbon conductors, and composite materials, with little metal content and small radar reflectivity. In some embodiments, the rolled EAP devices and electrical connections includes metal with a significant surface and are coated with a RAM.

The ring segments 222 connect a rolled EAP device 210*a* to a spoke or another rolled EAP device 210*a*. Any method known in the art may be used as a ring segment. In the illustrated embodiment, the ring segments simply connect the rolled EAP devices along a ring; and the rolled EAP devices provide azimuthal structural support. In some embodiments, the ring segments 222 are connected to rolled EAP devices, or spokes or other ring segments with one or more pivot joints such as hinges. If the extension is sufficiently large, then the angle between a ring segment 222 and its corresponding rolled EAP device may change as a radius of curvature for each ring changes. In such embodiments, pivot joints are useful.

In other embodiments, the ring segments are connected by ring slip sections that allow assemblies of ring segments to expand and contract, such as the outer contact ring, described next. In such embodiments the ring segment assemblies contribute to azimuthal structural support between spokes 204a. Different ends of each rolled EAP device are connected to different ring segments to provide a motive force for expansion. In some embodiments, the ring segments 222 are made of lightweight materials, such as honeycombed plastic and composite materials, with little metal content and small radar reflectivity. In some embodiments, the ring segments include metal with a significant surface and are coated with a RAM.

An extendable outer contact ring 230a provides a circumferential surface for connecting to another rotating body, either directly by contact or indirectly through a chain or belt or other mechanism known in the art. In an illustrated embodiment, the outer contact ring 230a includes multiple outer ring segments, each attached to one of the spokes 204a. The segments meet at edges about midway between the spokes. Each pair of outer ring segments is connected through one or more ring slip sections as described in more detail in a later section. In some embodiments, the outer contact ring segments are tubular with any cross-sectional shape known in the art. In some embodiments, the outer contact ring segments are open ended and slide on rails that serve as ring slip sections. In some embodiments, the circumferential surface of the outer ring segments for contacting the other rotating body is a rough surface that connects with the other rotating body through friction, e.g., either directly surface to surface, or indirectly through a rotating belt. In some embodiments, the circumferential surface of the outer ring segments for connecting to the other rotating body includes a row of gear teeth that meshes directly with gear teeth on the other rotating body or meshes with sprockets in a chain that couple to gear teeth on the other rotating body, as in a bicycle.

In some embodiments, the outer contact ring 230a is simply a contact surface on the outermost ring of rolled EAP devices. For example, in some embodiments the outer contact ring is a rough surface on the outermost ring of rolled EAP devices that connects to another rotating body through friction. In some embodiments the outer contact ring is a row of gear teeth attached directly to one or more rolled EAP devices on the outermost ring of rolled EAP devices that connects directly or indirectly with the gear teeth on another rotating body.

In some embodiments, the outer contact ring 230a extends parallel to an axis of rotation of the axle 202 away from the spokes 204a and rolled EAP devices 210a so that an inward surface of the outer contact ring can be used to make contact with another rotating body, as described in more detail in a later section. In some embodiments, the outer contact ring 230a is a cylindrical ring with substantial extent parallel to the axis at the contact radius rather than a wheel with limited axial extent. In some such embodiments, multiple assemblies of rings and spokes, as depicted in FIG. 2A, are placed coaxially but axially displaced within the cylindrical surface.

In some embodiments, the extendable outer contact ring 230a is made of lightweight materials, such as honeycombed plastic and composite materials, with little metal content and small radar reflectivity. In some embodiments, the extendable outer contact ring includes metal with a significant surface and is coated with a RAM.

The distributor 240 provides one or more time varying voltages to deform the rolled EAP devices 210a. In the illustrated embodiment, the axle 202, spokes 204a and ring segments 222 are electrically conductive and connected to electrical ground. The distributor 240 provides one time varying voltage that ranges from zero to a maximum effective voltage depending on the rotation ratio to be achieved by the transmission element 200a. That time varying voltage is fed through one insulated connection to input electrodes on all rolled EAP devices 210a. In some embodiments, a voltage drop is included on a connection from one electrode to another electrode on the same rolled EAP device to cause asymmetric deformation, as depicted in FIG. 1G. In other embodiments, different voltages are sent via separate insulated connections to different electrodes of the same rolled EAP device or to different rolled EAP devices or both. In some embodiments, the single insulated connection is provided a time varying voltage from a distributor or other device outside the transmission element 200a.

In the contracted state of transmission element 200a, a particular rolled EAP device, e.g. EAP device 212a, is at a contracted distance from the axle, as indicated in FIG. 2A by the contracted radius 213a. In the illustrated embodiment, all rolled EAP devices in one ring are at the same radius 213a. In other embodiments, one or more rolled EAP devices in the same rank are at different radii.

Figure 2B:
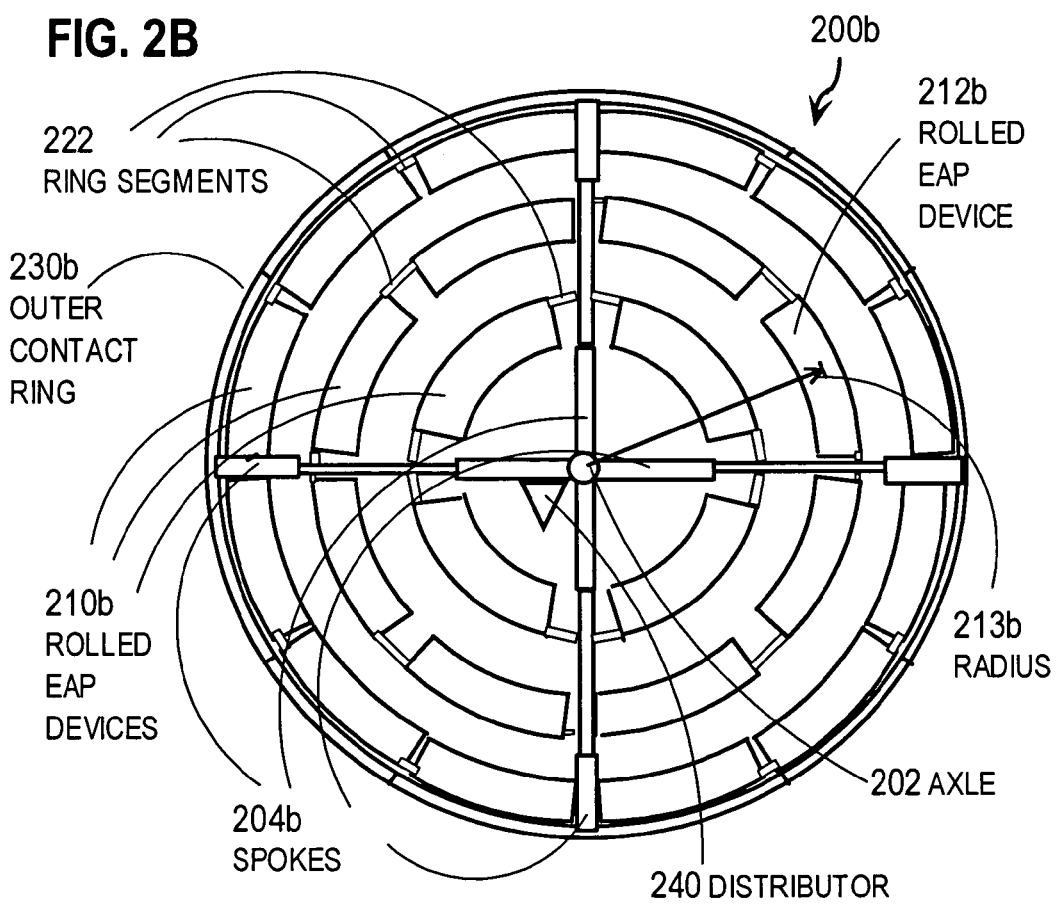
FIG. 2B is a block diagram that illustrates the transmission element in a second state, according to an embodiment.

FIG. 2B is a block diagram that illustrates the transmission element 200b in a second (extended) state, according to an embodiment. The components are the same as described above in transmission element 200a except that, in the extended state of transmission element 200b, the spokes 204b, the rolled EAP devices 210b and the outer contact ring 230b are all in extended states.

In the illustrated embodiment, two input electrodes are electrically grounded through the ring segments 222 and spokes 304a, and a maximum effective voltage is supplied to one input electrode of each rolled EAP device 210b and a smaller voltage is supplied to a second input electrode of each rolled EAP device 210b. When the rolled EAP devices 210b are extended in this way, the spokes extend in response and the total radius of the element increases. The increase is proportional to the increase in radius of each ring. For example, in the extended state, the radius 213b to rolled EAP device 212b in the middle ring is increased over the contracted radius 213a to the same rolled EAP device 212a in the contracted state. The radius of the outer contact ring 230b is increased proportionally.

The radius of the contact ring 230a, 230b depends on the expansion of the rolled EAP devices 210a, 210b, which is controlled by a voltage between a minimum and maximum effective voltage. Therefore the radius of the contact ring can be changed continuously from a minimum contact radius to a maximum contact radius. Thus for a particular axle rotation rate, the torque or rotation rate ratio can be changed continuously.

Because asymmetric voltage activation can be maintained to form a curved profile for each rolled EAP device, from maximum to almost minimum deformation, the rings of rolled EAP devices can be maintained with a circular shape. A circular shape for the outermost ring of EAP devices can obviate the use of a separate structure for the outer contact ring 230a, 230b.

In many embodiments, the distributor is used to assure that the various voltage differences for each ring are correct as the wheel expands or contracts. For example the outer ring rolled EAP devices may need to change more that lower ring rolled EAP devices to preserve the integrity of the circular shape as the transmission element expands. In some embodiments, more rolled EAP devices in the outer rings can reduce the differences, but in many embodiments different voltages are applied to the rolled EAP devices on the different rings. The actual voltage traces and timing for each ring may be easy to determine for one or more rolled EAP devices in a transmission element. EAP devices respond to mechanical deformation with voltage changes which can be measured. Therefore, the radius of a transmission element may be changed mechanically by an external force and the voltage traces output at each rolled EAP device can be recorded for each radius. Those recorded traces may then be applied to expand the transmission element to the desired contact radius.

Figure 2C:
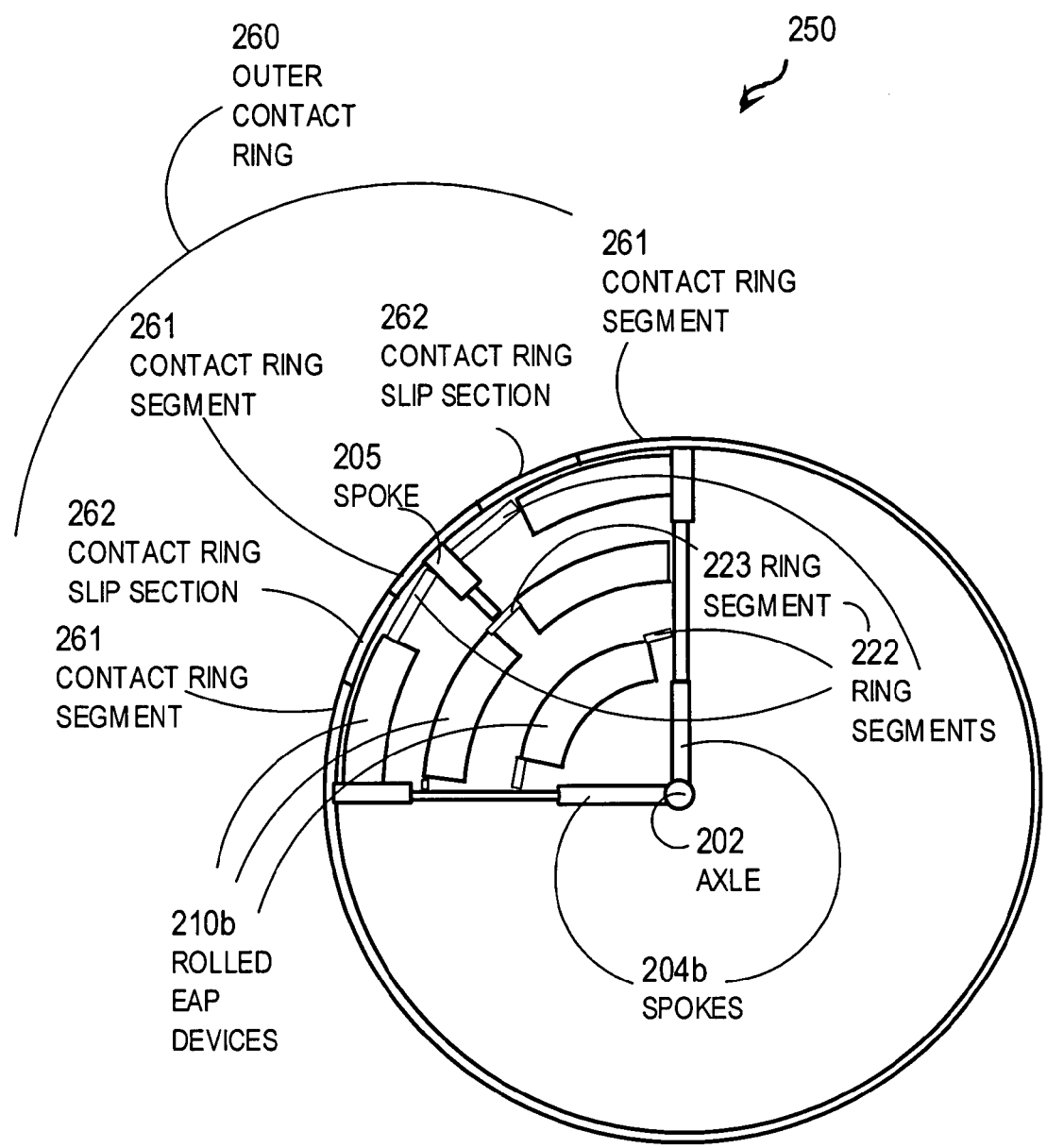
FIG. 2C is a block diagram that illustrates a portion of a transmission element, according to another embodiment.

FIG. 2C is a block diagram that illustrates a portion of a transmission element 250, according to another embodiment. In this embodiment another spoke 205 is added that is not attached to the axel 202 but is instead attached to ring segment 223. Two rolled EAP devices 210b in the outermost ring are connected to spoke 205 through additional ring segments 222.

FIG. 2C also illustrates the components of outer contact ring 260 according to an embodiment. Attached to each spoke, including spoke 205, is a contact ring segment 261. In the extended state, the contact ring segments 261 separate. Structural support and contact surfaces are provided by contact ring slip sections 262. In the contracted state, contact ring slip sections 262 are sheathed, in whole or in part, inside contact ring segments 261. The ring segments 261 and slip sections 262 can be curved, or can be made of multiple short straight segments approximately following chords of the circumference. Only a sector of rolled EAP devices is used as the outer contact ring in some embodiments in which the rest of the outer circumference is sufficiently flexible, yet retains shape, to accommodate changing radius of curvature as the rolls are expanded or contracted.

Figure 3:
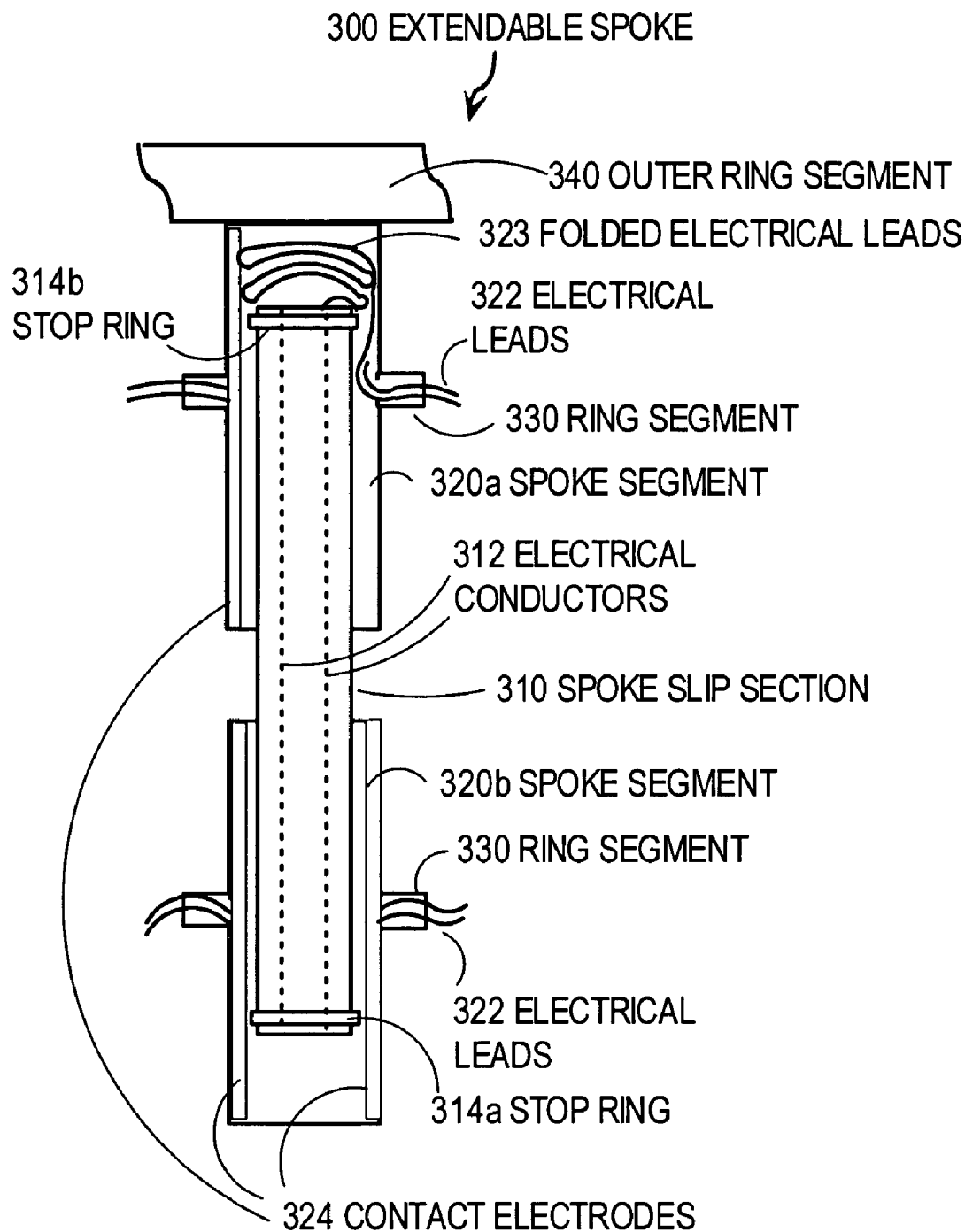
FIG. 3 is a block diagram that illustrates an extendable spoke according to an embodiment.

FIG. 3 is a block diagram that illustrates an extendable spoke 300 according to an embodiment. The extendable spoke 300 includes spoke segments 320a, 320b and spoke slip section 310. The spoke segments 320a, 320b act as sheaths for spoke slip section 310. Spoke segment 320a is connected to outer ring segment 340. Rings of rolled EAP devices are connected to spoke 300 at ring segments 330 attached to spoke segments 320a, 320b. In some embodiments, one or more rings of rolled EAP devices are connected to spoke 300 at ring segments (not shown) that attached at spoke slip section 310. As the rolled EAP devices connected to each ring segment 330 expand, spoke segment 320a slides away from spoke segment 320b, exposing more of spoke slip section 310.

In some embodiments, spoke slip section 310 includes one or more stop rings 314a, 314b that prevent spoke slip section 310 from separating from either or both spoke segments 320a, 320b.

In some embodiments, spoke 300 includes one or more electrical leads 322 that provide insulated electrical connections between an electrical distributor and a rolled EAP device. Any electrical connections can be used. Two types of electrical connections are shown in FIG. 3. In the illustrated embodiment, spoke slip section 310 includes two electrical conductors 312. In some embodiments, one conductor 312 is connected to electrical ground and the other is insulated from electrical ground. In some embodiments, the spoke slip section 310 and spoke segments 320a, 320b are electrically conductive and connected to electrical ground. In some such embodiments, one of electrical conductors 312 is omitted. In some other such embodiments, both of electrical conductors 312 are insulated from ground. Thus spoke 300 carries one or more voltages separate from electrical ground for driving the rolled EAP devices.

In some embodiments, electrical conductors 312 in spoke slip section 310 are electrically connected to contact electrodes 324 inside each spoke segment 320a, 320b by one or more electrodes in stop rings 314a, 314b. In some embodiments, electrical conductors 312 in spoke slip section 310 are electrically connected to electrical leads inside each spoke segment 320a, 320b that fold when the slip section 310 is sheathed and unfold when the slip section is exposed, such as folded electrical leads 323. In some embodiments, electrical leads 322 connected to the rolled EAP devices are connected to the contact electrodes 324 in the spoke segments 320a, 320b. In some embodiments, electrical leads 322 connected to the rolled EAP devices are connected to the folded leads 323 in the spoke segments 320a, 320b.

In some embodiments, the extendable spokes include one or more rolled EAP devices aligned radially. In some embodiments, the rolled EAP devices are placed only on the spokes. In such embodiments the circumferential and azimuthal parts expand and contract via slip components. In such embodiments, the distributor has a more complex job of managing the rate of change of the various rolled EAP devices to preserve the circular shape.

Expanding Circumference Gear Teeth

Figure 4A:
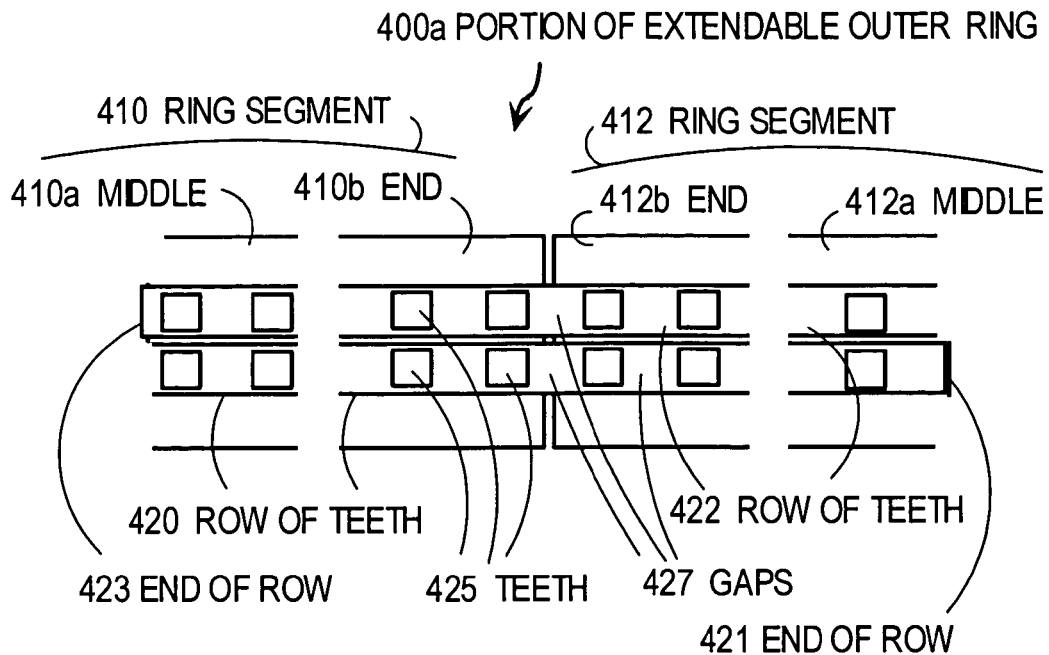
FIG. 4A is a block diagram that illustrates a plan view of an extendable outer ring in a first state, according to an embodiment.

In some embodiments in which the transmission element contacts another rotating body directly or indirectly with gear teeth, special arrangement of gear teeth on the expanding contact ring of the transmission element are used. FIG. 4A is a block diagram that illustrates a plan view of a contact surface of an extendable outer ring 400a in a contracted state, according to an embodiment. This view looks along a radius from the axle. In some embodiments, this view illustrates the outside of the extendable contact ring. In some embodiments in which the contact ring is extended in the direction of the axis of the axle beyond the spokes and rolled EAP devices, this surface may be the inside of the extendable contact ring.

In FIG. 4A, two ring segments 410, 412 meet at their ends, completely sheathing a contact ring slip section. FIG. 4A depicts both the meeting end 410b of ring segment 410 and also a middle portion 410a of ring segment 410. FIG. 4A also depicts both the meeting end 412b of ring segment 412 and also a middle portion 412a of ring segment 412. In some embodiments, the middle portions 410a, 412a are attached to spokes on the opposite face of the outer ring.

The extendable outer ring 400a includes two rows 420, 422 of gear teeth. In other embodiments, more rows of gear teeth are included. Each row 420, 422 of gear teeth includes alternating teeth 425 and gaps 427. When in the contracted state illustrated in FIG. 4A, the teeth and gaps in the two rows are aligned and can mesh with teeth having the same spacing on another rotating or sliding body.

One row of teeth is fixed to one ring segment and the other row of teeth is fixed to the other segment. In the illustrated embodiment, row 420 is fixed to ring segment 410 and row 422 is fixed to ring segment 412. The row of teeth fixed to a ring segment is included for the entire length of the ring segment and extends beyond the ring segment to a distance about half the length of an adjacent ring segment. Thus, the row 420 of teeth fixed to ring segment 410 extends all along ring segment 410 and reaches to the middle of ring segment 412, as shown by the end 421 of row 420 in the middle section 412a of ring segment 412. Similarly, the row 422 of teeth fixed to ring segment 412 extends all along ring segment 412 and reaches to the middle of ring segment 410, as shown by the end 423 of row 422 in the middle section 410a of ring segment 410. In many embodiments using this rows of gear teeth and gaps, the transmission element is disengaged from the connection to the other rotating body while the teeth stretch. A similar disengagement occurs in a manual automobile transmission in which gear shifting requires use of a clutch.

Figure 4B:
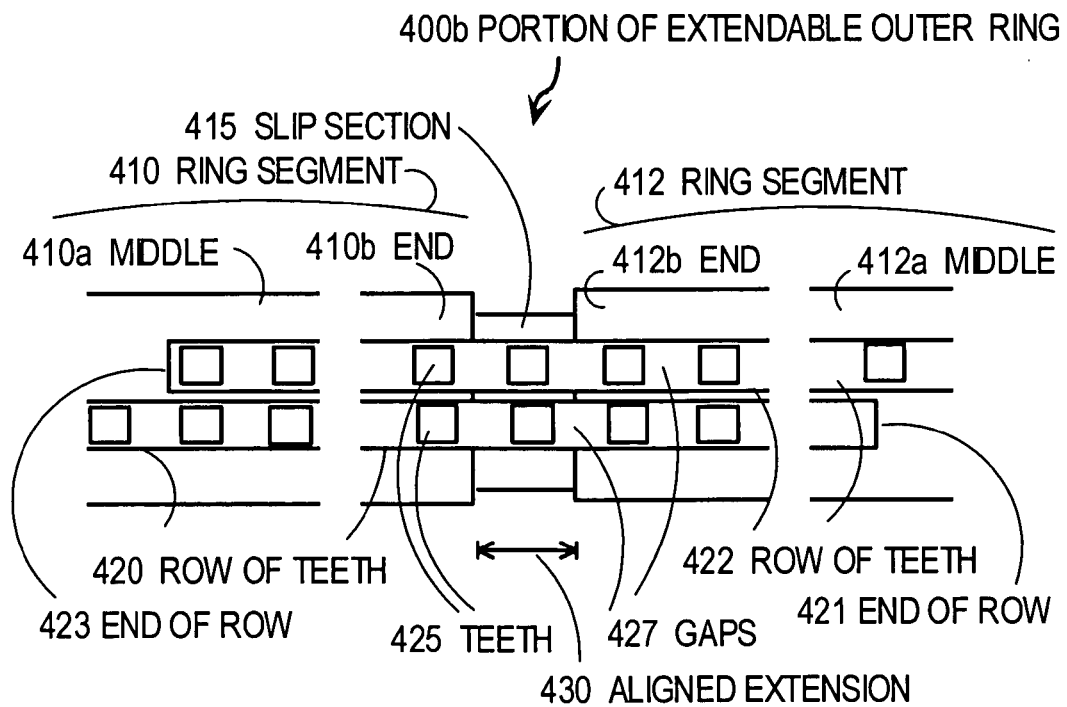
FIG. 4B is a block diagram that illustrates a plan view of an extendable outer ring in a second state, according to an embodiment.

FIG. 4B is a block diagram that illustrates a plan view of the extendable outer ring 400b in a partly extended state, according to an embodiment. In this state, the extendable outer ring 400b has extended by a distance called herein an aligned extension 430 and indicated by the arrows in FIG. 4B. The extension has exposed a portion of the ring slip section 415. Compared to FIG. 4A, the left ring segment 410 has moved to the left by the aligned extension 430. The row 420 of teeth fixed to this ring segment 410 has also moved to the left by the same amount. The top row 422 of teeth and its ring segment 412 have not moved. As can be plainly seen, the teeth 425 and gaps 427 are again aligned to mesh with teeth of similar spacing on a second rotating or sliding body. Thus the distance of extension is called an aligned extension 430.

The aligned extension 430 is approximately the minimum increment of extension that will allow meshing of teeth with a second body. For an extension of about half the aligned extension 430, the teeth of one row will fall in the gaps of the other row. This will prevent meshing with teeth on a second rotating or sliding body. It is clear that for multiples of the minimum increment of extension, the teeth on the extendable outer ring 400a, 400b align with teeth on the second body. Thus the ratio of rotation rate achieved with these teeth is almost continuously variable, but with a ratio increment related to the distance of the minimal increment of extension and the radius of the transmission element. As the radius of the transmission element increases, the ratio increment gets smaller.

It is noted that in the middles 410a, 412a of the ring segments 410, 413, respectively, after extension, there is only one tooth for meshing with the second body. Therefore, the gap between the rows of teeth 420, 422 should be small compared to the width of the teeth in the second body. In the illustrated embodiment, the distance to cross both rows 420, 422 is taken to be the width of the teeth in the second body.

Figure 4C:
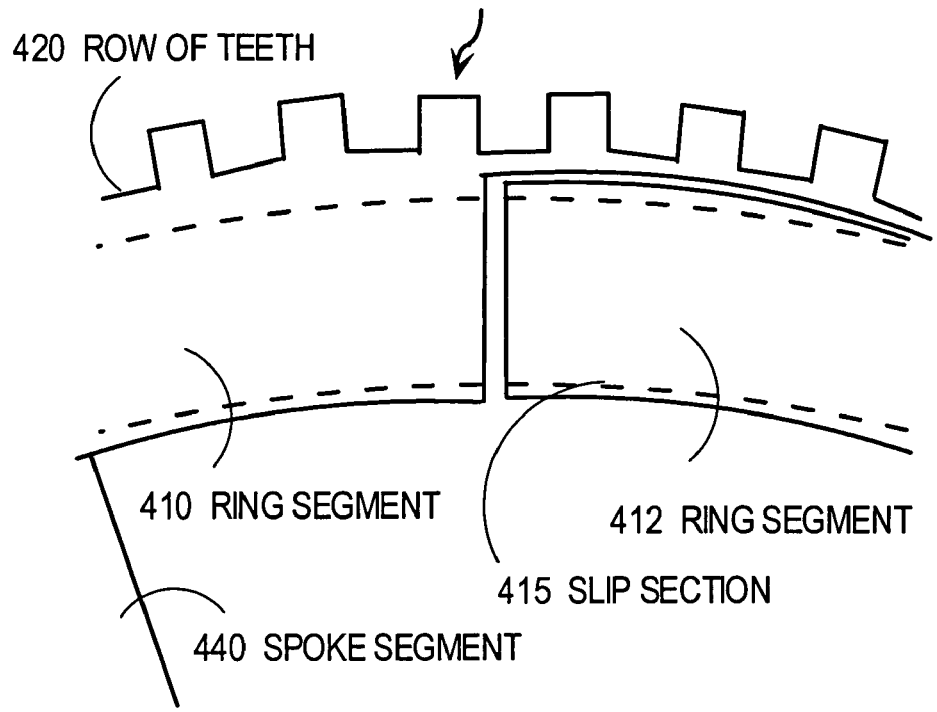
FIG. 4C is a block diagram that illustrates an elevation view of an extendable outer ring, according to an embodiment.

FIG. 4C is a block diagram that illustrates an elevation view of an extendable outer ring 400a, according to an embodiment. As described above, ring segment 410 includes row 420 of teeth that extends over ring segment 412. Ring slip section 415 is indicated by dashed lines inside ring segments 410, 412. The contact ring is in the contracted state so that slip section 415 is not exposed. In some embodiments, the radius of curvature of the ring slip section 415 is greater than the radius of curvature of ring segments 410, 412. Ring segment 410 is attached to spoke segment 440. Row 422 of teeth fixed to ring segment 412 is hidden behind row 420 of teeth because the two rows of teeth are aligned in the contracted state.

Figure 4D:
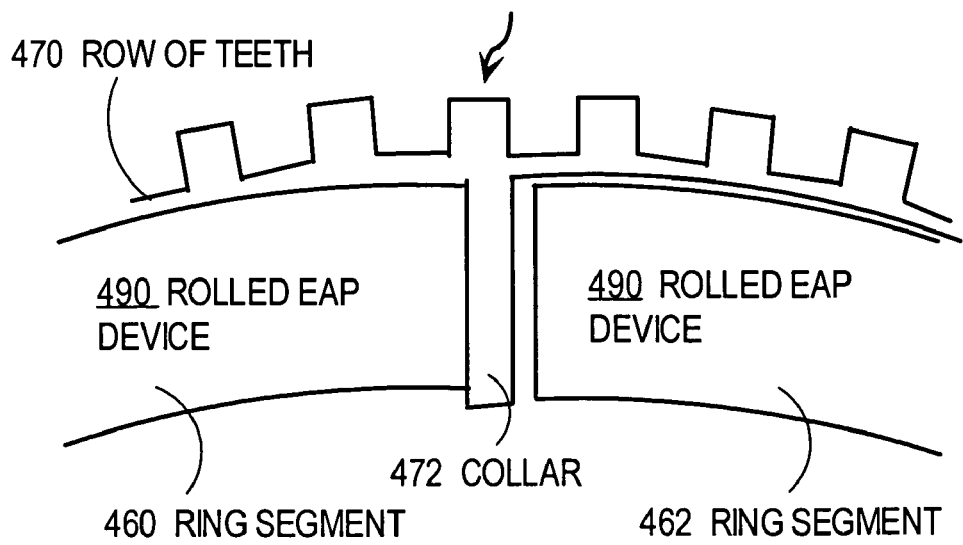
FIG. 4D is a block diagram that illustrates an elevation view of an extendable outer ring, according to another embodiment.

FIG. 4D is a block diagram that illustrates an elevation view of an extendable outer ring 450, according to another embodiment. In this embodiment, there is not a separate structural contact ring. Instead, rolled EAP devices 490 make up the ring segments 460, 462. In this embodiment, the rows of teeth are attached directly to rolled EAP devices in the outermost ring. In the illustrated embodiment, row 470 of teeth is attached by collar 472 to rolled EAP device 490 in ring segment 460. The row 470 extends to the adjacent collars on adjacent rolled EAP devices 490.

Although shown in a transmission element that includes rolled EAP devices, in other embodiments, the rows of aligned teeth are used with other transmission elements with an expanding contact ring even absent any rolled EAP devices.

Transmissions

A transmission is made up of one or more transmission elements to be connected to a motor and an external rotating body. Any arrangement of transmission elements and connections to motors and external bodies may be used. A few examples are provided for illustrative purposes.

Figure 5A:
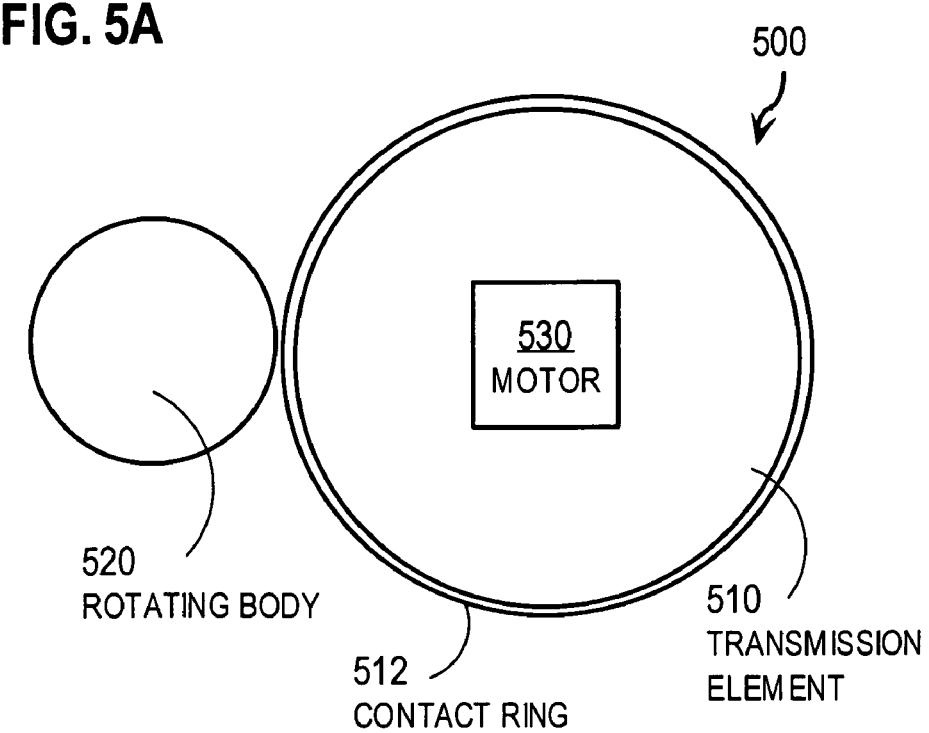
FIG. 5A is a block diagram that illustrates use of a transmission element in a transmission, according to an embodiment.

FIG. 5A is a block diagram that illustrates use of a transmission element in a transmission, according to an embodiment 500. Embodiment 500 includes a transmission element 510, motor 530, and external rotating body 520. Transmission element 510 includes contact ring 512 and is shown in a partially extended state. In this embodiment, the motor is coupled to the axle of transmission element 510 and the rotating body 520 contacts an outer surface of the contact ring 512. In some embodiments, the rotating body and outside surface of contact ring 512 have rough surfaces for frictional coupling. In some embodiments, the rotating body and outside surface of contact ring 512 have gear teeth for meshing gears.

In some embodiments a pulley and belt (e.g., a rubber belt) arrangement is used, in which one or more pulleys increase or decrease their diameter. In some embodiments a chain and sprocket configuration is used with a clutch-like mechanism similar to the means for changing gears on a bicycle. For example, in some embodiments, the EAP transmission element is employed on a bike instead of the many gears to which the chain is guided with current bicycle gears. As the EAP devices deform, the gear ratio changes. The chain is lifted off the transmission element as the teeth slip past each for a different contact radius and consequent different gear ratio.

In the depicted arrangement, the transmission element revolves once with each revolution of the drive shaft of the motor 530. In a contracted state, with contracted radius about the same size as the rotating body, the rotating body 520 revolves about once with each revolution of the motor and contact ring. This corresponds to "lowest gear." In the partially extended state depicted in FIG. 5A, the rotating body revolves several times with each revolution of the motor 530 and contact ring 512. This corresponds to one of several "middle gears." In a fully extended state, the rotating body 520 revolves most frequently with each revolution of the motor and contact ring. This corresponds to "highest gear." Using a rough surface, the ratio of revolutions of the rotating body relative to revolutions of the motor can be varied continuously from lowest gear to highest gear. Using gear teeth, the ratio can be varied incrementally from the lowest gear to at or near the highest gear.

Figure 5B:
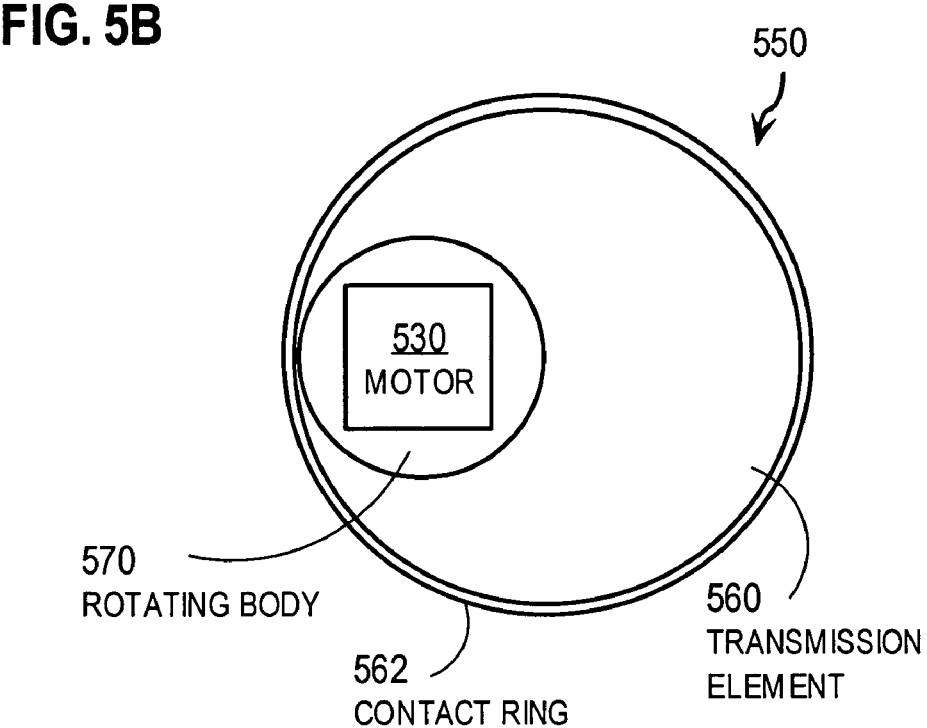
FIG. 5B is a block diagram that illustrates use of a transmission element in a transmission, according to an second embodiment.

FIG. 5B is a block diagram that illustrates use of a transmission element in a transmission, according to a second embodiment 550. Embodiment 550 includes a transmission element 560, motor 530, and external rotating body 570. Transmission element 560 includes contact ring 562 and is shown in a partially extended state. In this embodiment, the motor is coupled to the axle of the rotating body 570 and the rotating body 570 contacts an inner surface of the contact ring 562. In some embodiments, the rotating body and inner surface of contact ring 562 have rough surfaces for frictional coupling. In some embodiments, the rotating body and inner surface of contact ring 562 have gear teeth for meshing gears.

In the depicted arrangement, the rotating body 570 revolves once with each revolution of the drive shaft of the motor 530. In a contracted state, with contracted radius about the same size as the rotating body, the transmission element 560 revolves about once with each revolution of the motor 530. This corresponds to "highest gear." In the partially extended state depicted in FIG. 5B, the motor and rotating body revolve several times before the contact ring 562 and the axle of the transmission element revolves even once. This corresponds to one of several "middle gears." In a fully extended state, the motor and rotating body 520 revolve most to make each revolution of the contact ring. This corresponds to "lowest gear." Using a rough surface, the ratio of revolutions of the rotating body relative to revolutions of the motor can be varied continuously from highest gear to lowest gear. Using gear teeth, the ratio can be varied incrementally from the highest gear to at or near the lowest gear.

FIG. 5C is a block diagram that illustrates use of multiple transmission elements in a transmission 590, according to a third embodiment 580. Embodiment 580 includes a transmission 590, motor 530, and two external rotating bodies 520, 582. Transmission 590 includes transmission elements 592, 594, 596 with contact rings 593, 595, 597, respectively, which are all shown in partially extended states. Transmission 590 also includes distributor 591 to vary the voltages applied to the rolled EAP devices in transmission elements 592, 594, 596. In the illustrated embodiment, the distributor is used for each transmission element as well as for the assembly. In other embodiments, multiple different distributors are used, e.g., one distributor for each transmission element and another distributor for the assembly.

In this embodiment, revolutions of rotating body 520 are determined by motor 530. The radii of transmission elements 592, 594, 596 are varied by distributor 591 to cause rotating body 582 to rotate at a desired number of revolutions per minute.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A motor transmission apparatus comprising:
   an axle;
   an expandable circumferential component at a contact radius from the axle mechanically connected to the axle, said circumferential component for connection to a different rotating body;
   a plurality of rolled electroactive polymer devices mechanically connected to the expandable circumferential component and the axle,
   wherein
      each rolled electroactive polymer device has a first pair of input electrodes and is configured to deform substantively parallel to a roll longitudinal axis upon application of an electric potential difference across the first pair of input electrodes, and
      deformation of a rolled electroactive polymer device causes a change in the contact radius.

2. A motor transmission apparatus comprising:
   an axle;
   a plurality of expandable spokes connected to the axle;
   a plurality of rolled electroactive polymer devices arranged azimuthally around the axle at a particular radius, and mechanically connected to the plurality of expandable spokes,
   wherein
      each rolled electroactive polymer device has a first pair of input electrodes and is configured to deform substantively parallel to a roll longitudinal axis upon application of an electric potential difference across the first pair of input electrodes, and
      deformation of a rolled electroactive polymer device causes a change in the particular radius.

3. The apparatus as recited in claim 2, wherein:
   the apparatus further includes an expandable circumferential component at a contact radius, said circumferential component for connection to a different rotating body; and
   deformation of the rolled electroactive polymer device causes a change in the contact radius that is based on the change in the particular radius.

4. The apparatus as recited in claim 2 wherein the axle is configured for direct connection to a rotating drive shaft of a motor.

5. The apparatus as recited in claim 3 wherein the different rotating body is connected to a rotating drive shaft of a motor.

6. The apparatus as recited in claim 3, wherein the expandable circumferential component is mechanically connected to a spoke of the plurality of expandable spokes.

7. The apparatus as recited in claim 3, wherein the expandable circumferential component is mechanically connected to a rolled electroactive polymer device of the plurality of rolled electroactive polymer devices.

8. The apparatus as recited in claim 2, further comprising a different plurality of rolled electroactive polymer devices arranged azimuthally about the axle at a different radius, and mechanically connected to the plurality of expandable spokes.

9. The apparatus as recited in claim 3, wherein:
   the expandable circumferential component comprises a plurality of rows of gear teeth;
   each row of the plurality of rows of gear teeth slides independently of a different row of the plurality of rows of gear teeth with a change in circumference of the expandable circumferential component; and
   teeth in each of the plurality of rows are aligned between teeth on the different rotating body at a plurality of values for the contact radius.

10. The apparatus as recited in claim 3, wherein the expandable circumferential component is a rough surface that causes friction to engage a surface of a connection to the different rotating body.

11. The apparatus as recited in claim 2, wherein each rolled electroactive polymer device has a second pair of input electrodes and is configured to deform independently along the roll longitudinal axis on one side of the rolled electroactive polymer device upon application of an electric potential difference across the second pair of input electrodes.

12. The apparatus as recited in claim 10, further comprising an electrical distributor to supply a first voltage to the first pair of electrodes and a different second voltage to the second pair of electrodes to cause a side of the rolled electroactive polymer device closer to the axle to have a shorter length than an opposite side of the rolled electroactive polymer device.

13. The apparatus as recited in claim 2, wherein at least one of said axle and said plurality of expandable spokes comprises a structure with a specific gravity substantively similar to honeycombed plastic.

14. The apparatus as recited in claim 2, wherein at least one of said axle and said plurality of expandable spokes are made to have low radar reflectivity compared to a same surface area of metal.

15. The apparatus as recited in claim 3, wherein said expandable circumferential component comprises a structure with a specific gravity substantively similar to honeycombed plastic.

16. The apparatus as recited in claim 2, wherein said expandable circumferential component is made to have low radar reflectivity compared to a same surface area of metal.

17. The apparatus as recited in claim 2, further comprising an electrical distributor to supply a first voltage to the first pair of electrodes.

18. The apparatus as recited in claim 17, an expandable spoke of said plurality of expandable spokes further comprising an electrical connection for connecting an electrode of the first pair of electrodes to the electrical distributor.

19. The apparatus as recited in claim 2, wherein an expandable spoke of said plurality of expandable spokes is electrically connected to ground and electrically connected to an electrode of the first pair of electrodes.

20. The apparatus as recited in claim 2, further comprising a ring element for mechanically connecting a rolled electroactive polymer device azimuthally to a spoke of the plurality of expandable spokes.

21. The apparatus as recited in claim 20, further comprising an expandable spoke attached to the ring element and not attached to the axle.

* * * * *